United States Patent [19]
Okuda et al.

[11] Patent Number: 5,360,219
[45] Date of Patent: Nov. 1, 1994

[54] EXHAUST MANIFOLD GASKET

[75] Inventors: Hiroaki Okuda, Hiroshima; Kazuhiro Nomoto, Higashiosaka; Kenji Kubouchi, Hirakata; Shizuo Itani, Daitou; Sadao Isomura, Ichikawa; Einosuke Suekuni, Higashihiroshima, all of Japan

[73] Assignee: Nippon Gasket Co., Ltd., Osaka, Japan

[21] Appl. No.: 961,867

[22] Filed: Oct. 15, 1992

[30] Foreign Application Priority Data

Oct. 15, 1991 [JP] Japan .................................. 3-293914

[51] Int. Cl.$^5$ .............................................. F16J 15/12
[52] U.S. Cl. .................................................. 277/235 B
[58] Field of Search ...................... 277/233, 234, 235 B

[56] References Cited

U.S. PATENT DOCUMENTS

| | | | |
|---|---|---|---|
| 1,823,342 | 9/1931 | Victor | 277/235 B X |
| 3,914,490 | 10/1975 | Fusiek | 277/235 R X |
| 3,924,863 | 12/1975 | Nakano et al. | 277/235 B |
| 4,508,777 | 4/1985 | Yamamoto | 277/235 B X |
| 4,728,110 | 3/1988 | Nakasone | 277/235 B X |
| 4,795,166 | 1/1989 | Irmler | 277/235 B X |
| 4,813,687 | 3/1989 | Nakayama et al. | 277/235 B X |
| 5,022,431 | 6/1991 | Grey et al. | 277/235 B X |
| 5,022,661 | 6/1991 | Nakasone | 277/235 B X |
| 5,082,298 | 1/1992 | Uchida et al. | 277/235 B |
| 5,087,058 | 2/1992 | Miura et al. | 277/235 B |
| 5,215,315 | 6/1993 | Belter | 277/235 B |

FOREIGN PATENT DOCUMENTS

| | | | |
|---|---|---|---|
| 494801 | 7/1992 | European Pat. Off. | 277/235 B |
| 500273 | 8/1992 | European Pat. Off. | 277/235 B |
| 116149 | 7/1987 | Japan . | |
| 261169 | 5/1990 | Japan . | |
| 261170 | 5/1990 | Japan . | |
| 2266166 | 10/1990 | Japan | 277/235 B |

*Primary Examiner*—Scott W. Cummings
*Attorney, Agent, or Firm*—Browdy and Neimark

[57] ABSTRACT

The exhaust manifold gasket according to present invention consists of a pair of beaded plates provided with beads extending along the circumferences of exhaust holes therein, and a piled plate assembly inserted between these beaded plates. The piled plate assembly consists of a pair of flat plates, and a refractory sheet member disposed between these flat plates and containing a core plate therein. The refractory sheet member is formed out of a material having a high thermal resistance, excellent heat insulating characteristics and a high compression resiliency at a high temperature, such as a mica material. Accordingly, this exhaust manifold gasket has an improved compression resiliency at a high temperature and an improved sealability at a high temperature, and is capable of properly cutting off the transfer of heat.

13 Claims, 4 Drawing Sheets

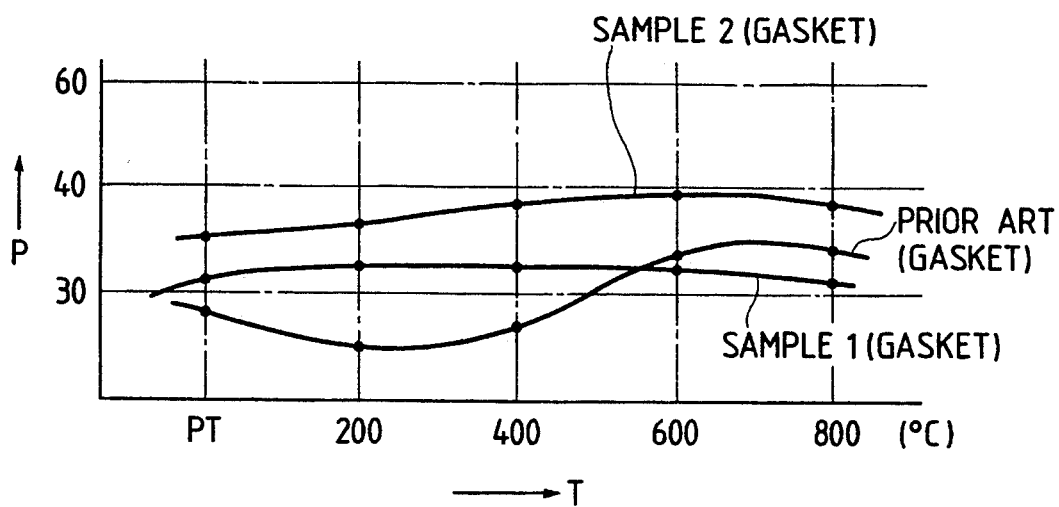
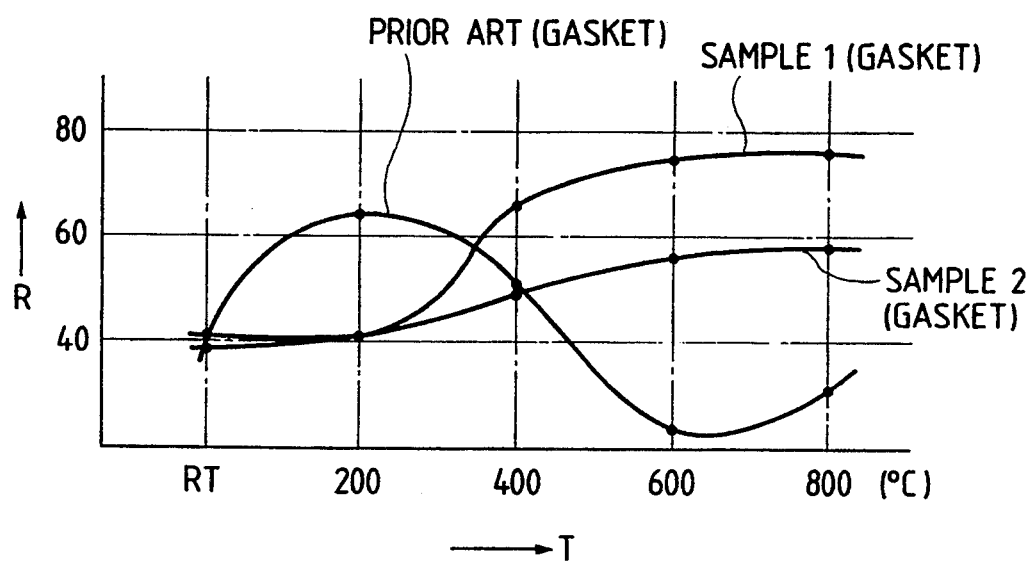

EXHAUST MANIFOLD GASKET

BACKGROUND OF THE INVENTION

1. FIELD OF THE INVENTION

This invention relates to an exhaust manifold gasket inserted between the opposed joint surfaces of a cylinder head and an exhaust manifold and tightened and fixed with tightening bolts.

2. DESCRIPTION OF THE PRIOR ART

An exhaust manifold gasket for an engine which is inserted between a cylinder head and an exhaust manifold and tightened with tightening bolts has been provided so as to prevent an exhaust gas from leaking from the joint surfaces, i.e. contact surfaces of a cylinder head and an exhaust manifold. Various types of gaskets are being used; a typical gasket being made from asbestos.

In a high performance engine for automobiles which is being developed with a view to reducing the weight and dimensions thereof or increasing its output level, new techniques have recently been employed, and they cause problems to arise in some cases. The problems include an increase in the thermal expansion or thermal contraction, which occurs when the temperature varies of a cylinder head because of the employment of an aluminum alloy out of which the cylinder is formed so as to reduce the weight thereof, an increase in the thermal deformation of a gasket mounting surface, i.e. a mounting flange of an exhaust manifold because of the reduction of the wall thickness thereof, the breakage of a gasket because of the stress, a thermal load imparted to the gasket under certain conditions of thermal cycle during the use of the engine, and the leakage of a gas due to a sudden decrease of a sealing surface pressure. Under these circumstances, a method using a metal gasket as an effective sealing means instead of a conventional asbestos gasket has become generally known, and various types of metal gaskets have been developed.

For example, Japanese Utility Model Laid-Open No. 116149/1987 discloses a laminated type metal manifold gasket for engines. In this manifold gasket, laps are formed on the edges of gas passing holes, and seal beads are provided on the portions of two adjacent intermediate plates out of laminated metal plates which are around the exhaust holes therein, which intermediate plates are arranged with the beads thereon opposed to each other or facing in the opposite directions. A stainless steel plate is provided on the exhaust manifold-contacting surface of one outer plate, and the cylinder head-contacting surface of the other outer plate is subjected to a rust proof treatment (plating, chemical treatment or formation of a heat resisting film). All of these metal plates are combined unitarily into a laminated structure by a binding means, such as spot welding. In this manifold gasket, the thickness of the cylinder head-side outer plate is set larger than those of the remaining plates in the laminated structure, or the cylinder head-side outer plate is formed as a connecting plate joining together the gaskets corresponding to the exhaust ports of the engine.

Japanese Utility Model Laid-Open No. 61169/1990 discloses a laminated type metal manifold gasket. This gasket is inserted between the end surface of a mounting flange of an exhaust manifold and a side surface of a cylinder head in which exhaust gas discharge ports are opened, and consists of at least three metal plates laminated in a non-combined state without being fastened to one another. The metal plates positioned on both sides consist of beaded seal plates, and an intermediate metal plate a thin plate at least one surface of which is coated with a smooth surfaced layer of a heat insulating material, such as a ceramic material. In this gasket, the intermediate plate consists of a thin plate at least one surface of which is coated with a smooth-surfaced layer of a heat insulating material composed of a mixture of a ceramic material and a metal material, and the beaded plates positioned on both sides are provided with beads on the opposed sides thereof or on the non-opposed sides thereof.

Japanese Utility Model Laid-Open No. 61170/1990 discloses a laminated type manifold gasket. This gasket is inserted between the end surface of a mounting flange of an exhaust manifold and a side surface of a cylinder head in which exhaust gas discharge ports are opened, and consists of at least three thin plates laminated in a non-combined state without being fastened to one another. The thin plates positioned on both sides consist of beaded seal plates, and at least one surface of the intermediate plate a smooth-surfaced layer of a heat insulating material, such as a ceramic material. In this gasket, the intermediate plate consists of a heat insulating material composed of a mixture of a ceramic material and a metal material, and the beaded plates positioned on both sides are provided with beads on the opposed sides thereof. These beaded plates positioned on both sides may be provided with beads on the non-opposed side thereof as well instead of the opposed sides thereof.

A laminated type metal gasket in which a plurality of thin metal plates mentioned above are laminated has a high flexibility and a high thermal resistance, and comes to have a suitable compressibility by being provided with beads. The sealability of such a gasket rarely deteriorater with the lapse of time. Accordingly this gasket is used very advantageously for sealing a manifold which expands greatly at a high temperature.

Although the conventional metal gaskets have these advantages, they have the following problems. A conventional metal manifold gasket consists of metal plates, and it therefore has an extremely high heat conductivity. Accordingly, high heat is radiated from the engine to the exhaust manifold and the temperature gradient of the engine becomes high. Since the engine as a whole, exhaust manifold, cylinder head and cylinder head gasket are cooled rapidly, a thermal contraction load becomes large, so that, for example, cracks in the collecting portion of the exhaust manifold, cracks in the water hole portions of the cylinder head and cracks in the grommets of the cylinder head gasket occur. This causes various problems to arise which include a decrease in the sealing performance of the manifold gasket and a decrease in the endurance thereof.

In order that an engine has a high performance, a manifold having a high temperature gradient and excellent heat radiation performance is preferably provided. However, when the manifold is formed so as to have a higher temperature gradient, the cracks mentioned above occur. Let $Ts$ equal the temperature gradient of the exhaust manifold, $Tg$ the temperature of a portion in the vicinity of the portion into which the gasket is inserted, and $Tc$ the temperature of the exhaust gas collecting portion. The equation of:

$$Ts = Tc - Tg$$

is then established. The temperature gradient Ts of the exhaust manifold is Ts=250° C., for example, when a conventional asbestos gasket is used, Ts=325° C. when a three-layer metal gasket is used, and Ts=375° C. when a graphite gasket is used.

A maximum temperature of the exhaust manifold and engine mounting portion reaches about 700°-800° C. Therefore, when the gasket is formed out of a material other than a metal, it is very difficult to maintain the various characteristics thereof, such as compression resiliency, sealability, deformation resistance, fatigue resistance and strength while retaining the thermal resistance and heat insulating characteristics thereof. A metal gasket therefore has problems of eliminating these inconveniences and developing a method of forming a satisfactory metal manifold gasket.

Even the gaskets provided so as to solve these problems and disclosed in the above Japanese Utility Model Laid-Open Nos. 61169/1990 and 61170/1990 still have problems concerning the compression resiliency and heat shielding capability when the temperature increases to a high level due to an increase in the temperature of the exhaust gas, which is ascribed to an increased output of a recently-developed engine, and due to an increase in the flexure of the mounting surface of the exhaust manifold.

SUMMARY OF THE INVENTION

An object of the present invention is to solve these problems and provide an exhaust manifold gasket formed so as to ensure various characteristics, such as high-temperature compression resiliency, sealability and strength by making the best use of the advantages of a laminated metal gasket, and attain an optimum temperature gradient of a structure, such as an exhaust manifold, by inserting a heat resisting and insulating refractory sheet member having a high compression resiliency with respect to a high temperature between beaded thin metal plates, the thickness of which refractory sheet is regulated to a level suitable for the engine, whereby the sealability of the gasket at a high temperature is improved.

This exhaust manifold gasket consists of a pair of beaded plates formed out of a heat resisting metal material so as to be held between the joint surfaces of a pair of engine-forming members and having exhaust holes and beads and piled plate assembly disposed between these beaded plates. The piled plate assembly consists of a pair of flat plates formed out of a metal material of a high thermal resistance, a refractory sheet member disposed between the flat plates and having a high compression resiliency with respect to a high temperature, a high thermal resistance and excellent heat insulating characteristics, and a core plate buried in the refractory sheet member and formed out of a metal material of a high thermal resistance. Owing to such construction, this gasket can display its excellent sealing performance with respect to the opposed joint surfaces of the cylinder head and exhaust manifold. Namely, the beaded plates have the function of springs for offsetting a large deformation of the gasket mounting surfaces thereof, i.e. flanges and can display their excellent sealing performance with respect to the joint surfaces of the cylinder head and manifold.

Since the beaded plates can be formed so that they have the function of springs for offsetting a large deformation of the gasket mounting surfaces, i.e. flanges, and, especially, since the piled plate assembly has a high compression resiliency with respect to a high temperature, the gasket can follow up the thermal expansion of the cylinder head and exhaust manifold which occurs to a repeated thermal load, offset a thermal expansion difference between the two engine-forming parts and fulfill the function of sealing the joint surfaces of the same parts.

When the piled plate assembly is formed in a non-fastened state with respect to the beaded plates, heat transfer is prevented between these plates to cause the temperature gradient and heat insulating effect to increase. When each of the opposed surfaces of the beaded plates and piled plate assembly is formed smoothly, excellent sealed sliding surfaces can be provided to accommodate the variation of length of the plates due to a thermal expansion difference therebetween. Since the piled plate assembly is formed by laminating smoothly surfaced flat plates on both surfaces of the refractory sheet member, the sliding surfaces of the flat plates and the beaded plates positioned on the outer side of the flat plates are in good condition. It also becomes possible to regulate the thickness of the refractory sheet member in the piled plate assembly, regulate the degree of heat insulation properly owing to the regulation of this thickness, regulate to an optimum level the compression resiliency of the gasket in accordance with the type of the engine by forming the piled plate assembly suitably, and set the thermal conductivity of the gasket to an optimum level, whereby the degree of freedom of designing the gasket increases.

The piled plate assembly is formed out of a material having excellent heat insulating characteristics and a high thermal resistance, such as an alumina-silica refractory and mica, and disposed in a non-fastened state with respect to the beaded plates, i.e., separately therefrom. Therefore, the transfer of heat is prevented between these plates, and the temperature gradient increases due to the cutoff of the heat, so that the heat insulating effect of the gasket can be increased.

Since the refractory sheet member provided in the inner side of the piled plate assembly has a high thermal resistance, excellent heat insulating characteristics and a high compression resiliency at a high temperature, the sealability of the gasket at a high temperature can be improved, and the transfer of heat from a high-temperature structural member to a low-temperature structure member to a low-temperature structural member, for example, from a cylinder head to an exhaust manifold is cut off suitably, so that a desirable gasket structure can be provided.

This exhaust manifold gasket may also be formed so that another pair of beaded plates consisting of a metal material of a high thermal resistance are laminated on the outer side of the above-mentioned beaded plates.

This exhaust manifold gasket may further be provided with a grommet consisting of a metal material of a high thermal resistance, which is set around the edge of each exhaust hole in the two outer beaded plates so as to embrace these portions of the same beaded plates, whereby the sealability of the gasket is improved.

The metal material out of which the beaded plates are to be formed can be selected suitably. For example, the beaded plate positioned on the high-temperature side, for example, on the exhaust manifold side can be formed out of high-grade heat resisting steel having a high thermal resistance, for example, inconel (nickel alloy), and the engine-side beaded plate stainless steel (SUS304).

The piled plate assembly are formed so that it consists of beaded plates of a metal material each of which has at least one smooth surface, and a refractory sheet member of a heat insulating material, i.e. a plurality of plates of different materials. This enables the heat transfer rate of the assembly to be varied extensively, the range of regulation of the heat conductivity and heat insulating characteristics thereof to be increased, the degree of freedom of designing the gasket to be increased, and the strength of the piled plate assembly to be secured.

The beaded plates positioned on both sides can be laminated on the piled plate assembly with the beads thereon facing each other or in the opposite directions, and the sliding condition of the beaded plates and piled plate assembly can be set. The strength and elastic deformability of the gasket can be secured, and an excellent sealing function can be provided.

BRIEF DESCRIPTION OF THE DRAWINGS:

FIG. 9 is a graph showing the variation of compression rate of a refractory sheet member incorporated in this exhaust manifold gasket, with respect to the heating temperature; and FIG. 10 is a graph showing the variation of the restoration rate of the refractory sheet member incorporated in this exhaust manifold, with respect to the heating temperature.

DESCRIPTION OF THE PREFERRED EMBODIMENTS

The embodiments of the exhaust manifold gasket according to the present invention will now be described with reference to the drawings.

Figure 1:
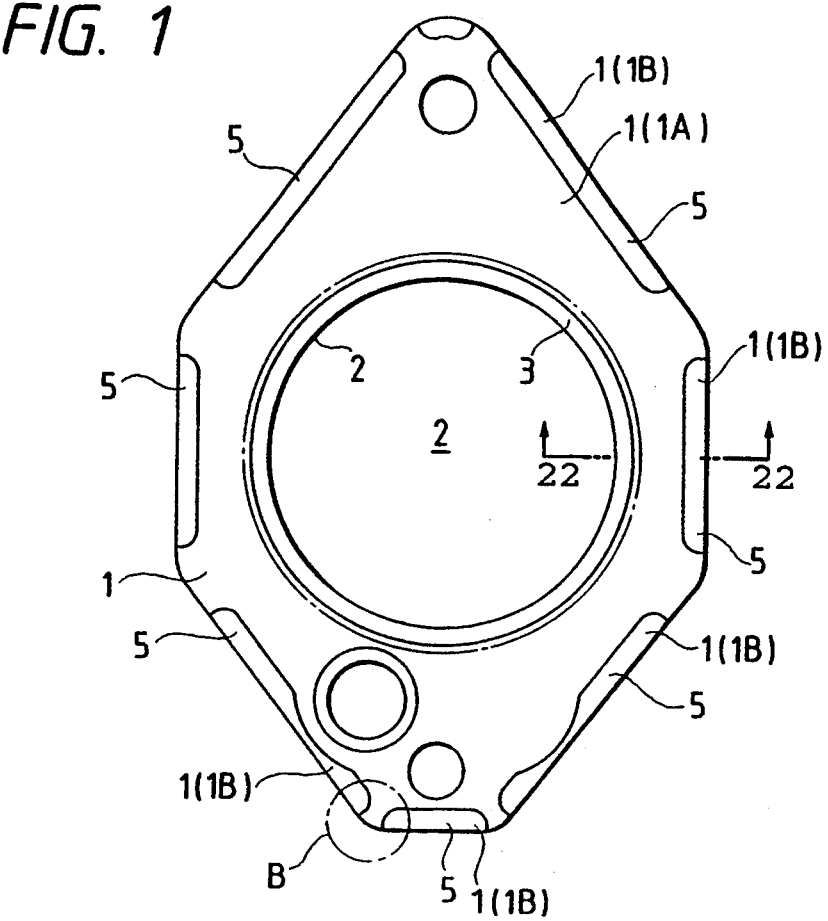
FIG. 1 is a plan view of an embodiment of a part of the exhaust manifold gasket according to the present invention.

An exhaust manifold gasket shown in FIG. 1 is held between the joint surfaces of an exhaust manifold and a cylinder head, so as to seal these surfaces opposed to each other. This exhaust manifold gasket is held between the joint end surface of an exhaust manifold and an end surface in which exhaust ports are opened of a cylinder head, and the exhaust manifold and cylinder head are fixed to each other with bolts to maintain the air tightness thereof and prevent the leakage of an exhaust gas.

In a multicylinder engine in which exhaust ports, the number of which corresponds to that of the cylinders are formed, exhaust manifold gaskets corresponding to that of the cylinders are provided on an end surface where the exhaust ports are opened on a cylinder head. Namely, four exhaust manifold gaskets are used in a four-cylinder engine, and six exhaust manifold gaskets in a six-cylinder engine. These exhaust manifold gaskets may be connected together by, for example, a connecting plate into a single exhaust manifold gasket, or connecting portions constituting a connecting plate may be formed integrally with a single metal plate which forms exhaust manifold gaskets so as to obtain an integral gasket structure. In an exhaust manifold, branch tubes the number of which is in agreement with that (number of cylinders on one side in a V-type engine) of the cylinders are put together at a collecting portion and connected to an exhaust pipe.

Figure 2:
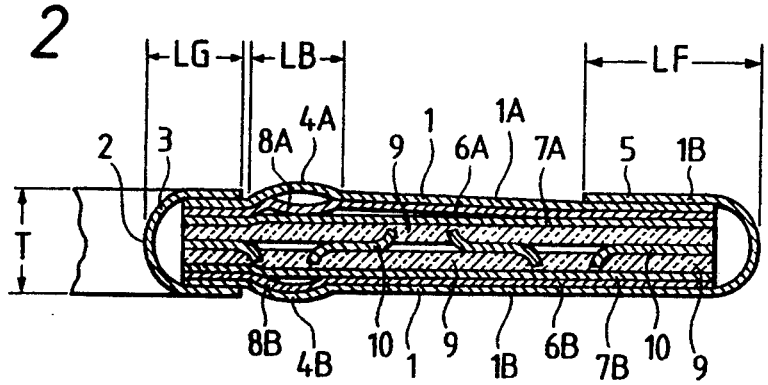
FIG. 2 is a sectional view taken along the line A—A in FIG. 1.
Figure 3:
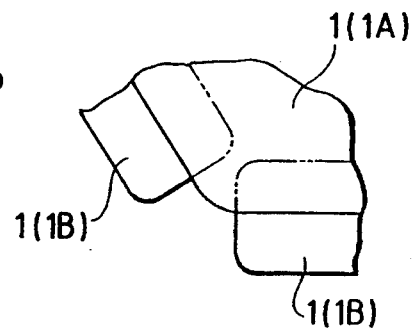
FIG. 3 is an expansion plan of a portion B of the embodiment of FIG. 1.

This exhaust manifold gasket is formed as a laminated structure having a pair of beaded plates 1A, 1B (generically designated by a reference numeral 1) formed out of a metal material of a high thermal resistance and provided with beads 4A, 4B, and piled plate assembly inserted between the beaded plates 1A, 1B. Between the beaded plates 1A, 1B and piled plate assembly, another pair of beaded plates 6A, 6B formed out of a metal material of a high thermal resistance and provided with beads 8A, 8B are inserted as shown in FIG. 2. In this exhaust manifold gasket, the beaded plates 1A, 1B, 6A, 6B and piled plate assembly are formed at the portions thereof which correspond to gas passing holes, i.e. exhaust holes 2 in a non-combined state in which the independent plates or laminated plates are not fastened to one another but set firmly by suitable means, such as bent members. Namely, as shown in FIG. 2, a grommet 3 formed out of a metal material of a high thermal resistance is attached to the portions of the beaded plates 1A, 1B which are around the exhaust hole 2 so as to embrace these outer beaded plates 1A, 1B. This grommet 3 is formed so that the end surfaces thereof are not superposed on the end surfaces of the beads 4A, 4B formed on the beaded plates 1A, 1B. At the portions of the beaded plates 1A, 1B which are distant from the exhaust hole 2, the end portion of one beaded plate 1A is set firmly by a lap 5 formed by turning up the relative end portion of the other beaded plate 1B so as to embrace the end portion of the beaded plate 1A.

The beaded plates 1A, 1B, 6A, 6B, flat plates 7A, 7B, core plate 10 and grommet 3 are formed out of a material of a high thermal resistance, such as stainless steel or inconel (nickel alloy). Since, especially, the beaded plates 1A, 1B, 6A, 6B have to offset large deformation, such as thermal deformation of the cylinder head and exhaust manifold, they are formed so as to have spring functions, i.e. an elastic deformability.

Concrete examples of materials selected for the production of this exhaust manifold gasket reside in the following. The beaded plates 1A, 6A, 6B can be formed out of inconel, and the beaded plates 1B, flat plates 7A, 7B, core plate 10 and grommet 3 stainless steel SUS. The beads 4A, 4B on the beaded plates 1A, 1B form projections extending outward while forming a clearance on the inner side thereof, i.e., between the beaded plates 1A, 1B and beaded plates 6A, 6B. In this case, the beaded plate 1A contacts the end surface of a flange of the exhaust manifold, and the beaded plate 1B the end surface of the exhaust port of the cylinder head on the side of the engine.

Another concrete example of materials selected for the production of this exhaust manifold gasket reside in the following. The beaded plates 1A, 1B, 6A, 6B can be formed out of inconel, and the flat plates 7A, 7B, core plate 10 and grommets 3 stainless steel SUS.

In this exhaust manifold gasket, examples of sizes of the beaded plates 1A, 1B, 6A, 6B, flat plates 7A, 7B, core plate 10 and grommet 3 are as follows. When these thin plates are formed out of stainless steel or inconel (nickel alloy), for example, the thickness t thereof is 0.2–0.3 mm, and the overall thickness T 2.5–4 mm. The length LB of the beads 4A, 4B formed on the beaded plates 1A, 1B is 2–4 mm, the length LG of the grommet 3 2–4 mm, and the length LF of the lap 5 of the beaded plate 1B 3–5 mm.

This exhaust manifold gasket has characteristics, especially in the piled plate assembly. This piled plate assembly consists of a pair of flat plates 7A, 7B formed out of a metal material of a high thermal resistance, a refractory sheet member 9 disposed between the flat plates 7A, 7B and having high-temperature compression resiliency, high thermal resistance and excellent heat insulating characteristics, and a core plate 10 buried in the refractory sheet member 9 and formed out of a metal material of a high thermal resistance, and the flat plates 7A, 7B and refractory sheet member 9 are laminated without being fastened to each other. The core plate 10 in the piled plate assembly has cut and raised portions eating into the refractory sheet member 9, these cut and raised portions being buried in the sheet member 9 firmly so that they do no shake therein. This refractory sheet member 9 is formed out of a material having a high compression resiliency at a high temperature, a high thermal resistance and excellent heat insulating characteristics, such as an alumina-silica refractory material, mica, alumina-silica fiber, alumina-silica whisker, and a mica ceramic material.

The materials for the refractory sheet member 9 incorporated in this exhaust manifold gasket will now be described concretely. The materials constituting this refractory sheet member 9 are the materials consisting of the above-mentioned minerals, and, for example, a mica material out of these materials has the following characteristics. A mica material is a natural incombustible material, and has a resistance to heat of not lower than 1000° C., so that it can sufficiently withstand the temperature of an exhaust gas in the exhaust hole 2 of, for example, 800°–900° C. Moreover, a mica material has a high electric corrosion resistance, excellent insulating characteristics, a high chemical resistance and excellent heat insulating characteristics. Samples 1 and 2 were made of a mica material, and the properties thereof was determined, the results being shown below.

The sample 1 contained 90% (MIN) of a mica material and 10% (MAX) of a binder, and had specific gravity of 1.8–1.9. The properties of the sample 1 are as follows. Weight decrease: 2.5–3.5% at 800° C. ×30 min. Tensile strength: 250 kgf/cm². Compression rate: 15%. Restoration rate: 40%. Dielectric force: 20 KV/mm. Compressive breaking strength: 408 kg/cm². Heat conductivity: 0.43 Kcal/m.h.°C. in the vertical direction and 4.3 Kcal/m.h.°C. in the horizontal direction. Thermal resistance (800° C.×2 hrs): No change in thickness.

The sample 2 contained 90% (MIN) of a mica material and 10% (MAX) of a binder, and had specific gravity of 1.6–1.7. The properties of the sample 2 are as follows. Weight decrease: 2.5–3.5% at 800° C. ×30 min. Tensile strength: 102 kgf/cm². Compression rate: 15% Restoration rate: 40%. Dielectric force: 20 KV/mm. Compressive breaking strength: 408 kg/cm². Heat conductivity: 0.43 Kcal/m.h.°C. in the vertical direction and 4.3 Kcal/m.h.°C. in the horizontal direction. Thermal resistance (800° C.×2 hrs): No change in thickness.

The characteristics of the compression rates P and compression restoration rates R of gasket using the samples 1 and 2 of a mica material with respect to variation of temperature are as shown in FIGS. 9 and 10. The gaskets were heat treated at 200° C., 400° C., 500° C. and 600° C. for one hour respectively to determine the thermal resistance thereof, and the results are shown in the drawings. It is understood that the compression rates P of the gaskets using the samples 1 and 2 of a mica material do not vary much with respect to temperature variation T as compared with that of a conventional gasket as shown in FIG. 9. It is also understood that the compression restoration rates R of the gasket using the samples 1 and 2 of a mica material become higher than that of a conventional gasket as shown in FIG. 10. Accordingly, when a mica material is incorporated in a piled plate assembly held between a pair of beaded plates constituting a gasket, the compression restoration rate R at a high temperature of the gasket becomes large, and, even when a thermal load is imparted to the gasket, it can display excellent sealability.

Figure 4:
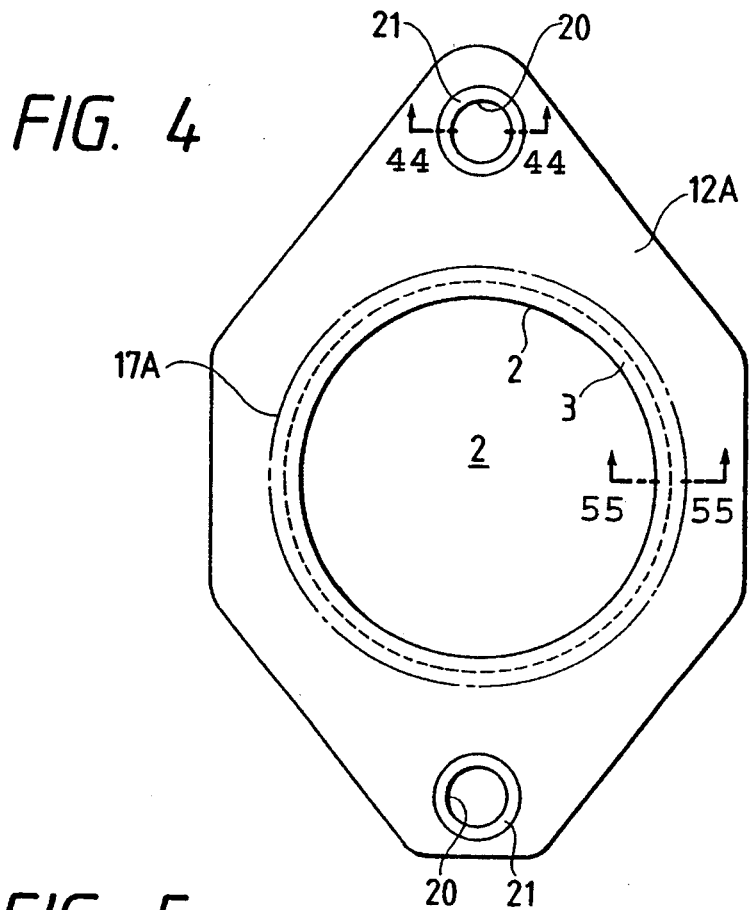
FIG. 4 is a plan view of another embodiment of a part of the exhaust manifold gasket.
Figure 5:
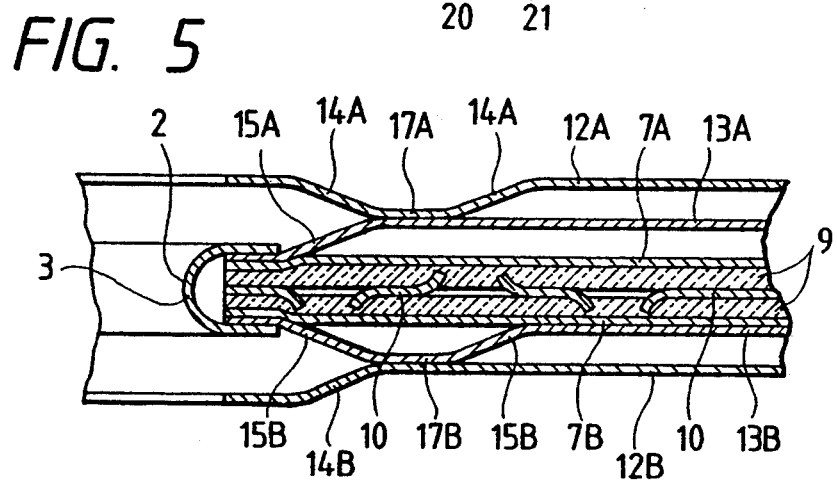
FIG. 5 is a sectional view taken along the line C—C in FIG. 4.
Figure 6:
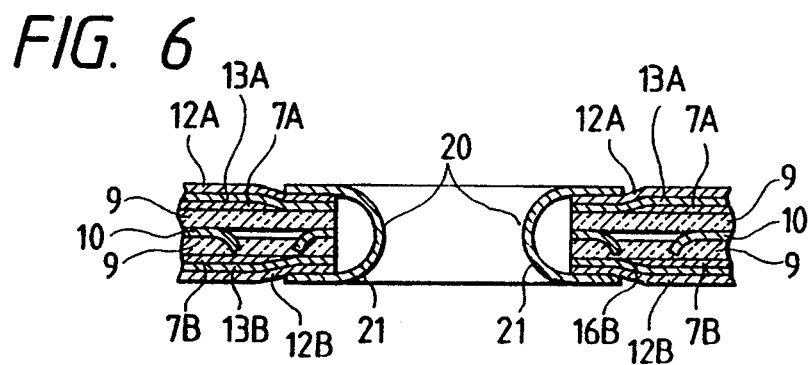
FIG. 6 is a sectional view taken along the line D—D in FIG. 4.

Another embodiment of the exhaust manifold gasket according to the present invention will now be described with reference to FIGS. 4, 5 and 6. Since the exhaust manifold gasket in this embodiment has the same construction and function as the above-described embodiment except that the shape of the beaded plates is different, the same members of the embodiment are designated by the same reference numerals.

The piled plate assembly incorporated in the second embodiment has the same construction as the first embodiment, i.e., it consists of pair of flat plates 7A, 7B, a refractory sheet member 9 disposed between the flat plates 7A, 7B, and a core plate 10 buried in the refractory sheet member 9. A beaded plate 13A which is opposed to the piled plate assembly and positioned on the side of the exhaust manifold, and which has not yet been practically set, contacts the flat plate 7A at the portion thereof which is close to an exhaust hole 2 through which an exhaust gas passes, and it is provided with a bead 15A which diverges from the flat plate 7A in the radially outward direction and extends by a predetermined distance, the bead 15A then extending in parallel with the flat plate 7A in a spaced state with respect thereto. A beaded plate 12A which is opposed to the beaded plate 13A and positioned on the side of the exhaust manifold, and which has not yet been practically set, has a bead 14A projecting toward the beaded plate 13A and is laminated on the beaded plate 13A with the top surface 17A of the bead 14A contacting the beaded plate 13A and with the remaining portion of the bead 14A spaced from the beaded plate 13A.

A beaded plate 13B which is opposed to the piled plate assembly and positioned on the side of the cylinder head, and which has not yet been practically set, contacts the flat plate 7B at the portion thereof which is close to the exhaust hole 2 through which an exhaust gas passes and at the periphery portion thereof, and it is provided with a bead 15B which diverges in the radially outward direction and extends by a predetermined distance, and a ridge portion 17B contacting a beaded plate 12B. The beaded plate 12B which is opposed to the beaded plate 13B and positioned on the side of the cylinder head, and which has not yet been practically set, has a bead 14B extending so as to diverge from the beaded plate 13B toward the exhaust hole 2, and is laminated on the beaded plate 13B with the ridge portion 17B of the beaded plate 13B contacting the beaded plate 12B and with the remaining portion of the beaded plate 12B spaced from the beaded plate 13B.

The grommet 3 is fixed around the exhaust hole 2 so as to embrace the inner beaded plates 13A, 13B. The beaded plates 12A, 12B which are positioned on the outer side of the beaded plates 13A, 13B, and which have not yet been practically set, are spaced from the grommet 3. At the portion of the gasket which corresponds to a setting bolt hole 20 formed in the exhaust manifold, the thin plates of the piled plate assembly and beaded plates 12A, 12B, 13A, 13B are all laminated in a contacting state, and a holdfast 21 is fixed around the setting bolt hole 20.

Figure 7:
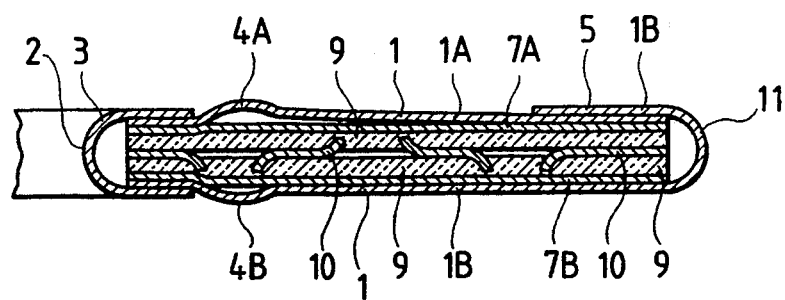
FIG. 7 is a sectional view, which corresponds to a sectional view taken along the line A—A in FIG. 1, of still another embodiment of a part of the exhaust manifold gasket.

Still another embodiment of the exhaust manifold gasket according to the present invention will now be described with reference to FIG. 7. Since this embodiment has the same construction and functions as the embodiment of FIG. 2 except that one exhaust manifold side and one engine side, i.e. cylinder head side beaded plates 1A, 1B are further laminated, the same members are designated by the same reference numerals, and duplicated descriptions thereof are omitted.

Figure 8:
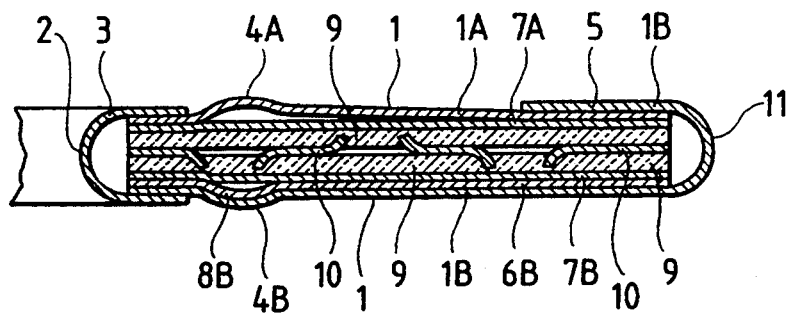
FIG. 8 is a sectional view, which corresponds to a sectional view taken along the line A—A in FIG. 1, of a further embodiment of a part of the exhaust manifold gasket.

Another embodiment of the exhaust manifold gasket according to the present invention will now be described with reference to FIG. 8. Since this embodiment has the same construction and function as the embodiment of FIG. 2 except that one beaded plate 1A on the side of the exhaust manifold is further laminated the same members are designated by the same reference numerals, and duplicated descriptions thereof are omitted.

What is claimed is:

1. An exhaust manifold gasket comprising:
   a pair of beaded plates which have first exhaust holes through which an exhaust gas passes, and which consist of a thermally resistant elastically deformable metal material, said beaded plates being provided with sealing beads extending along the circumferences of said first exhaust holes,
   a piled plate assembly disposed between said beaded plates and having a second exhaust hole concentric with said first exhaust holes, said piles plate assembly consisting of a pair of flat plates formed out of a thermally resistant metal material, a refractory sheet member disposed between said flat plates having compression restoring characteristics, and a core plate buried in said refractory sheet member and formed of a thermally resistant metal material having cut-and-raised portions projecting into said refractory sheet member, and
   a grommet enclosing the circumferences of said first and second exhaust holes respectively in said beaded plates and said piled plate assembly, said grommet formed of a thermally resistant metal material.

2. An exhaust manifold gasket according to claim 1, wherein said piled plate assembly is laminated to said beaded plates in a non-fastened state.

3. An exhaust manifold gasket according to claim 1, wherein said metal plates and said refractory sheet member in said piled plate assembly are laminated in a non-fastened state.

4. An exhaust manifold gasket according to claim 1, wherein said beads on said beaded plates project outward so as to form hollow spaces between the inner surfaces of the same beaded plates and the outer surfaces of said piled plate assembly.

5. An exhaust manifold gasket according to claim 1, wherein said core plate in said piled plate assembly has cut and raised portions eating into said refractory sheet member.

6. An exhaust manifold gasket according to claim 1, wherein said refractory sheet member is formed out of an alumina refractory material or a silica refractory material.

7. An exhaust manifold gasket according to claim 1, wherein said refractory sheet member is formed out of a mica material.

8. An exhaust manifold gasket according to claim 1, wherein said beaded plates are formed out of stainless steel.

9. An exhaust manifold gasket according to claim 1, wherein said beaded plates are formed out of inconel.

10. An exhaust manifold gasket according to claim 1, wherein said beaded plates disposed at a high-temperature side are formed out of inconel, said beaded plates disposed at a low-temperature side being formed out of stainless steel.

11. An exhaust manifold gasket according to claim 1, wherein said core plate is formed out of stainless steel.

12. An exhaust manifold gasket comprising:
   a pair of inner beaded plates which have first exhaust holes through which an exhaust gas passes, and which consist of a thermally resistant elastically deformable metal material, said beaded plates being provided with sealing beads extending along the circumferences of said first exhaust holes,
   a piled plate assembly dispose between said inner beaded plates and having a second exhaust hole concentric with said first exhaust holes, said piled plate assembly consisting of a pair of flat plates formed of a thermally resistant metal material, a refractory sheet member disposed between said flat plates and having compression restoring characteristics, and core plate buried in said refractory sheet member and formed of a thermally resistant metal material having cut-and-raised portions projecting into said refractory sheet member,
   a grommet which is provided so as to enclose the circumferences of said first and second exhaust holes in said inner beaded plates and said piled plate assembly, and which is formed of a thermally resisting metal material, and
   another pair of outer beaded plates formed of a thermally resistant metal material laminated to an outer side of said beaded plates, each of said outer beaded plates having a third exhaust hole concentric with said first exhaust holes in the inner beaded plates and a bead formed so as to extend along the circumference of said third exhaust hole.

13. An exhaust manifold gasket according to claim 12, wherein a top surface portion of a bead on each of said inner beaded plates is respectively in contact with a bead on each of said outer beaded plates.

* * * * *